US006682338B2

(12) United States Patent
Maurilio

(10) Patent No.: US 6,682,338 B2
(45) Date of Patent: Jan. 27, 2004

(54) INJECTION ASSEMBLY FOR INJECTION MOULDING MACHINES FOR PLASTICS MATERIAL

(75) Inventor: Meschia Maurilio, Usmate (IT)

(73) Assignee: Negri Bossi S.p.A., Cologno Monzese (IT)

( * ) Notice: Subject to any disclaimer, the term of this patent is extended or adjusted under 35 U.S.C. 154(b) by 0 days.

(21) Appl. No.: 10/062,495

(22) Filed: Feb. 5, 2002

(65) Prior Publication Data
US 2002/0132027 A1 Sep. 19, 2002

(30) Foreign Application Priority Data
Feb. 8, 2001 (IT) ...................... MI2001A0253

(51) Int. Cl.⁷ ............................... B29C 45/56
(52) U.S. Cl. ........................ 425/567; 425/145
(58) Field of Search ................... 425/567, 145, 425/150

(56) References Cited
FOREIGN PATENT DOCUMENTS

| EP | 0 427 866 | 5/1991 |
|---|---|---|
| EP | 1 000 730 | 5/2000 |
| JP | 6-106586 | 4/1994 |
| JP | 8-57921 | 3/1996 |
| JP | 10-109341 | 4/1998 |
| JP | 2000-84987 | 3/2000 |
| JP | 2000-108173 | 4/2000 |

Primary Examiner—Tim Heitbrink
(74) Attorney, Agent, or Firm—Nixon & Vanderhye P.C.; Frank P. Presta

(57) ABSTRACT

An injection assembly for injection molding machines for plastics material comprises a fixed frame (10, 21), a plastication cylinder (2) integral with the fixed frame, a plastication screw (5) acting inside the plastication cylinder, making a forward translational movement during the stage of injection of the plastics material into a cavity of a mold and a rotatory movement around its own axis and a rotatory translational movement of rotation around its own axis and retraction during the plastics material plastication stage, the plastication screw (5) being mounted integral in translation with a movable plate (23) mounted slidably on said fixed frame, there being provided drive means for translation of the movable plate (23), and drive means for rotation of the plastication screw (5).

10 Claims, 4 Drawing Sheets

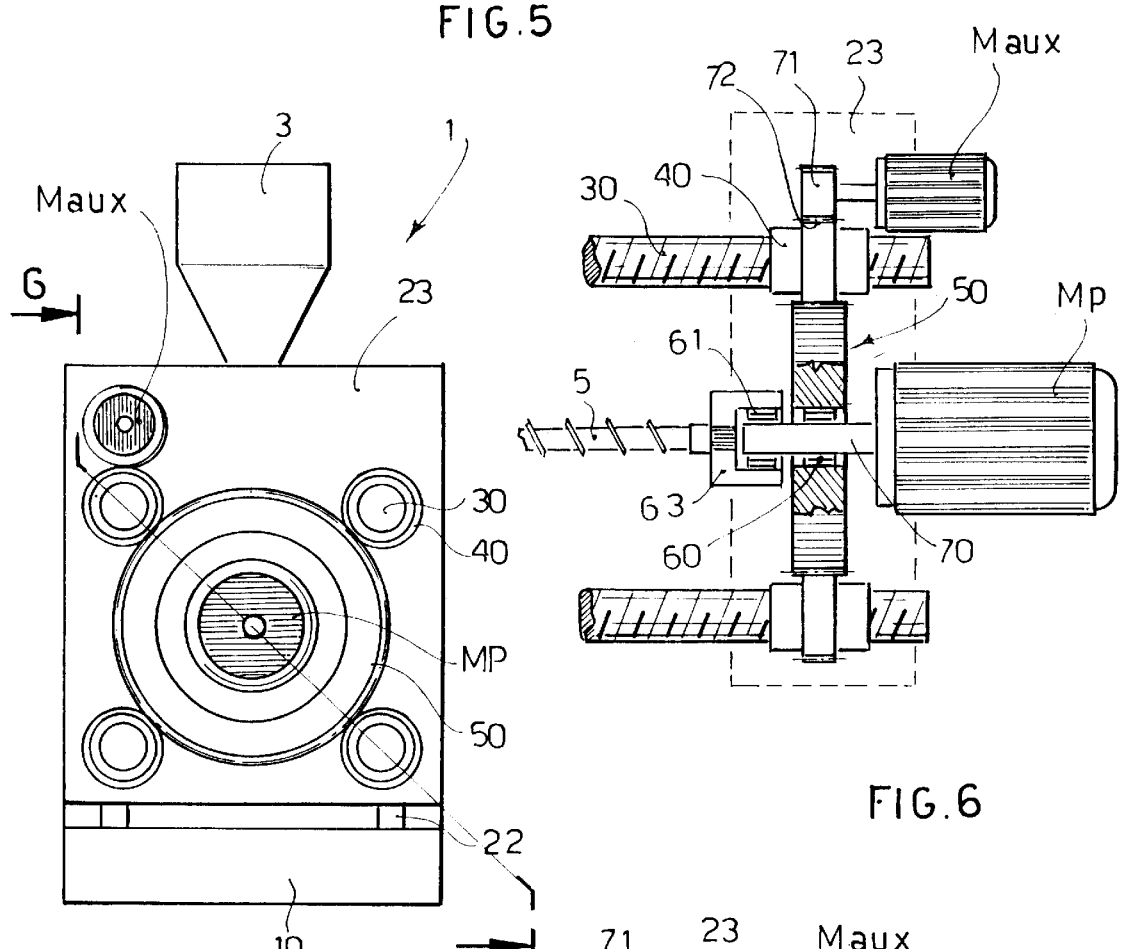
FIG.5
FIG.6
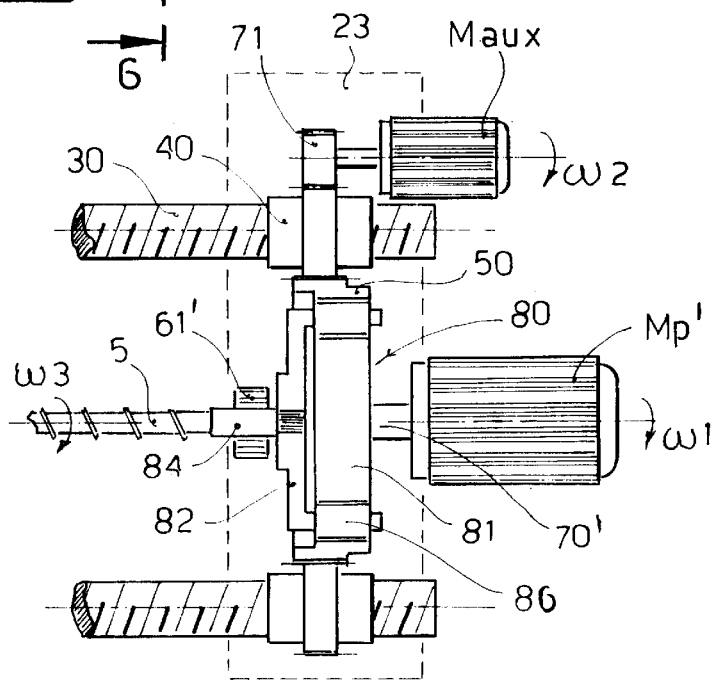
FIG.7

INJECTION ASSEMBLY FOR INJECTION MOULDING MACHINES FOR PLASTICS MATERIAL

BACKGROUND OF THE INVENTION

1. Field of the Invention

The present invention relates to an injection assembly for injection moulding machines for plastics material.

2. Description of Related Art

According to the prior art, in the injection moulding procedure, injection moulding machines or devices are used wherein resins, consisting of plastics material, are heated to be brought to a molten state in a heating cylinder and are injected at high pressure into a cavity of a mould so as to fill same. The resin in the molten state is cooled inside the mould so as to harden and form the moulded product. At this point the mould is opened and the moulded is extracted and can be sent to storage or subsequent processing stages.

The injection moulding device comprises a moulding assembly and an injection assembly. The first assembly is generally formed of two moulds halves mounted respectively on a fixed plate and a movable plate, so that the mould can be opened and closed by causing the movable plate to advance and retract.

FIG. 1 shows schematically an injection assembly according to the prior art, denoted as a whole with reference numeral 100. The injection assembly 100 comprises a heating cylinder 2 to bring the resins fed through a hopper 3 to a molten state, and an injection nozzle 4 to inject the molten material into the mould cavity. Inside the heating cylinder 2 is a plastication screw 5 which makes a rotatory movement around its own axis for plastication of the resins, a translational forward movement for injection of the molten material and a translational rearward movement which allows the resins to be introduced from the hopper 3.

The plastication screw 5 is driven by means of a system of electric motors. For the translational movement of the plastication screw, a screw-nut and screw system is provided wherein a screw 6, preferably a ball screw, engages in a screw nut 7. The screw nut 7 is driven by a motor 8 by means of a reduction unit 9 fixed to the frame 10 of the machine.

Rotatory movement of the screw 6 around its own axis is prevented by an anti-rotation device. Said anti-rotation device comprises a rod 11 fixed to the screw 6 and a stop block 12 fixed to the frame 10 of the machine. In this manner the rod 11, abutting against the stop block 12, prevents rotation of the screw 6, allowing only translation. Accordingly, operation of the electric motor 8 in one direction or in the opposite direction allows forward or backward movement of the screw 6, which draws with it the plastication screw 5.

As far as the movement of rotation of the plastication screw 5 is concerned, this is obtained by means of a splined shaft 13 connected by means of a joint 20 to the plastication screw 5. The splined shaft 13 engages in a bush 14 set in rotation by an electric motor 15 by means of a reduction unit 16 fixed to the frame 10 of the machine. The splined shaft 13 is uncoupled from the screw 6 by means of a ball bearing assembly 17, so that the rotatory movement of the plastication screw 5 can be independent of the translational movement imposed by the screw 6.

The electric motors 8 and 15 are provided respectively with encoder type sensors 18 and 19 to carry out the speed adjustments required in the various phases of the work cycle.

The above described injection assembly, according to the prior art, has a drawback due to the fact that the stage of translation of the plastication screw takes place under very high axial loads. Therefore the driving mechanism based only on the ball screw 6 works in very demanding conditions if it is applied to large-sized moulding machines. The problems concern in particular the state of stress of the ball screw 6 determined by the high and variable loads which lead to wear on the screw and screw nut system and compromise the strength of the entire construction.

Said problem can be overcome only in part by replacing the ball screw with a planetary roller screw.

BRIEF SUMMARY OF THE INVENTION

The object of the invention is to eliminate said drawbacks by providing an injection assembly for injection moulding machines for plastics material suitable to be applied to large-sized moulding machines so as to allow high performances and high production capacity.

Another object of the present invention is to provide such an injection assembly for plastics material that is practical, economical, versatile and easy to make.

These objects are achieved in accordance with the invention with the characteristics listed in appended independent claim 1.

Advantageous embodiments are apparent from the dependent claims.

The injection assembly for large-sized presses according to the invention is formed by a fixed base and a mobile structure translating on linear guides provided on the base. The plastication screw and the drive systems of the screw and of the movable structure are connected to the movable structure, whereas the plastication cylinder and the hopper are integral with the fixed part.

In a preferred embodiment of the invention the plastication assembly provides for use of four ball screws rigidly connected to the base, with the relative lead nuts positioned on the movable structure and free to rotate The movement of pure translation for the injection stage is obtained by simultaneously setting in rotation the lead screws which pull the entire moveable structure and thus also the plastication screw.

To obtain synchronous, concordant movement of the lead nuts, a crown gear that engages simultaneously with four gear wheels directly connected to said lead nuts is used.

The injection assembly according to the invention has various advantages with respect to systems of the prior art.

The injection assembly according to the invention in fact has an extremely simple actuating mechanism, based principally on the use of a plurality of ball screws which allow the high axial load during the injection phase to be shared out. This arrangement offers high guarantees on the strength of the structure, the precision of movement of the plastication screw and the reproducibility of the operations of the work cycle.

BRIEF DESCRIPTION OF THE SEVERAL VIEWS OF THE DRAWINGS

Further characteristics of the invention will be made clearer by the detailed description that follows, referring to purely exemplary and therefore non-limiting embodiments thereof, illustrated in the appended drawings, in which:

FIG. 5 is a view similar to that of FIG. 3, illustrating a second embodiment of the drive of the injection assembly according to the invention;

FIG. 6 is a partially sectional, broken off view taken along the planes of section 6—6 of FIG. 5; the position of the mobile plate is illustrated with a dashed line;

FIG. 7 is a similar view to FIG. 6, illustrating a third embodiment of the drive of the injection assembly according to the invention;

DETAILED DESCRIPTION OF THE INVENTION

Figure 1:
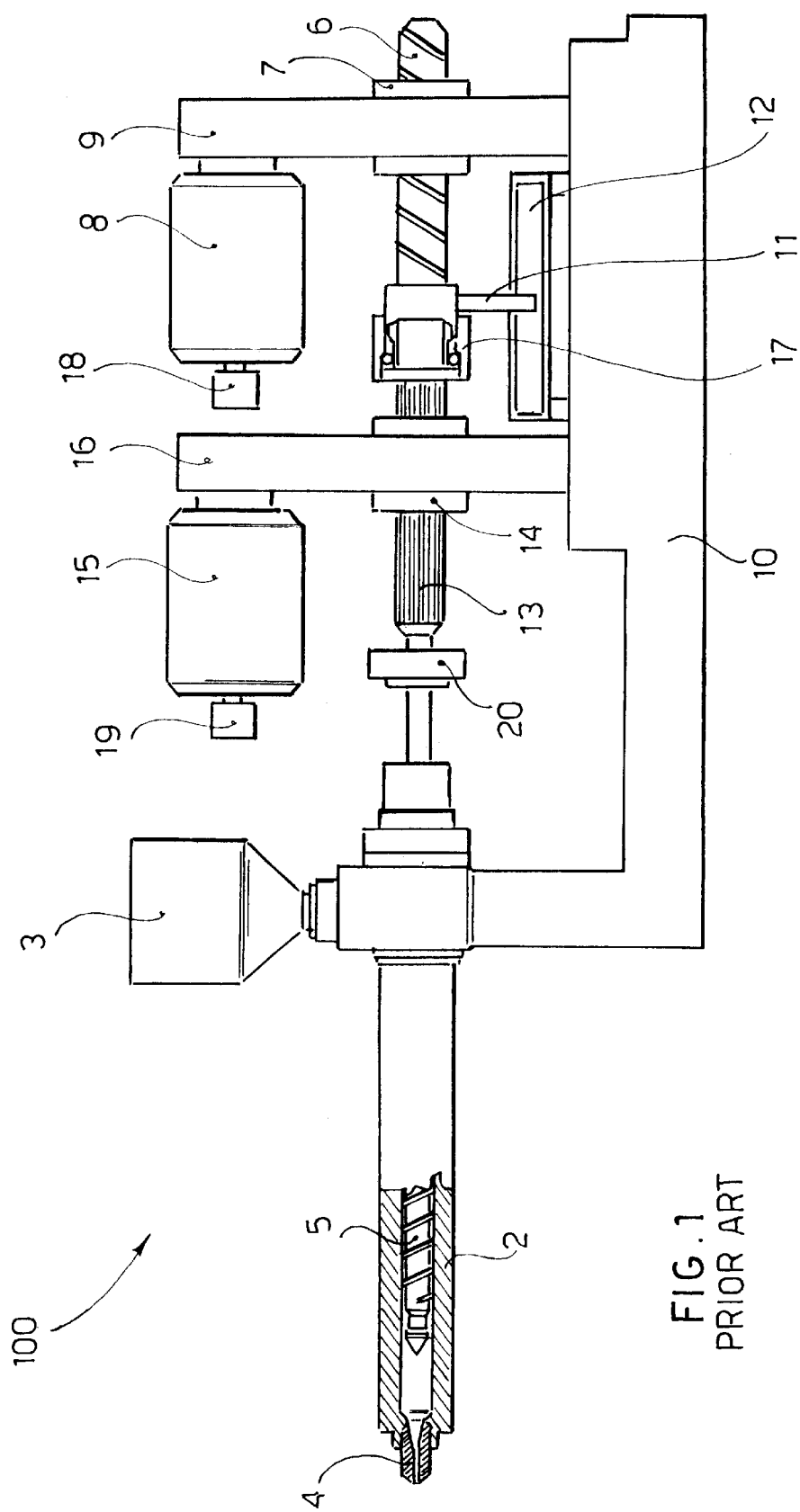
FIG. 1 is a schematic side elevational view of an injection assembly according to the prior art.

The injection assembly according to the invention is described with the aid of FIGS. 2–8.

Like or corresponding elements will be designated herein with the same reference numerals and will not be described in detail.

Figure 2:
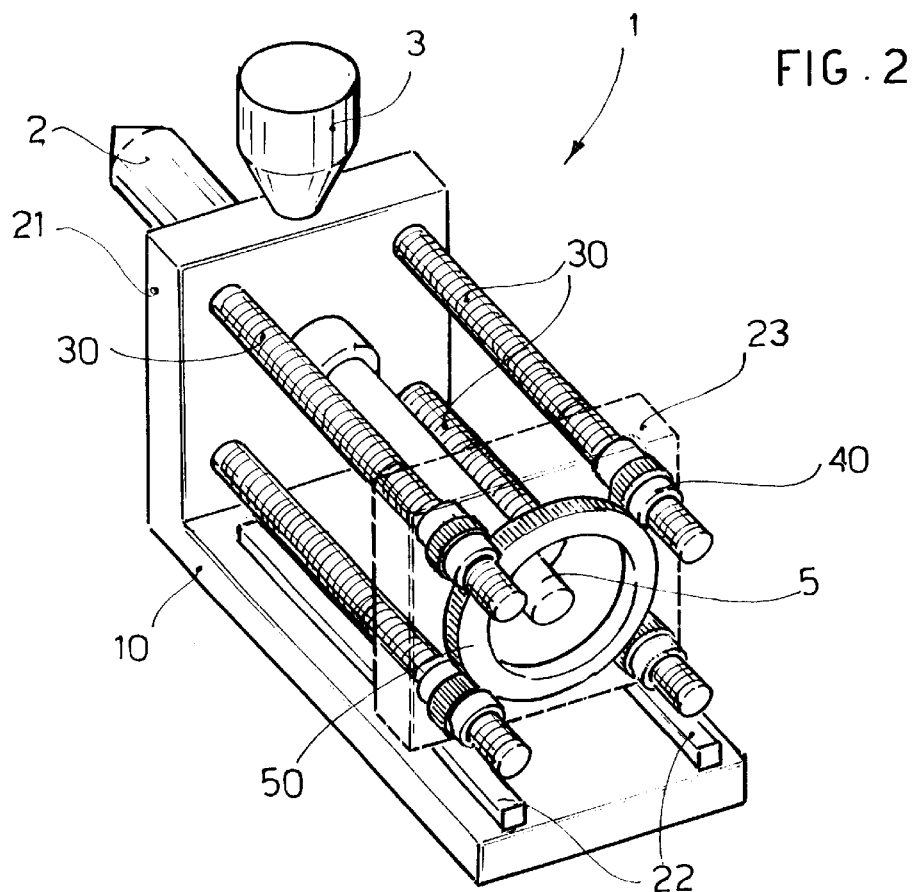
FIG. 2 is a schematic, axonometric view of an injection assembly according to the invention, with some parts removed; the movable plate is illustrated with a thin line and broken off.

FIG. 2 shows schematically an injection assembly according to the invention as a whole, designated with reference numeral 1.

The injection assembly 1 comprises a frame having an L-shaped longitudinal section, consisting of a base 10 and a fixed plate 21 which protrudes upward at right angles to the base 10. Two guides 22 in the form of tracks parallel to each other are mounted on the base 10.

A movable plate 23 is mounted slidably on the guides 22 so as to remain at right angles to the base 10 and parallel to the fixed plate 21. The movable plate 23 has two grooves (not shown) which engage in the respective guide tracks 22.

Rigidly fixed to the fixed plate 21 of the base 10 are four drive screws 30 disposed near the four corners of the fixed plate 21. The drive screws 30 engage in respective lead screws or screw nuts 40 rotatably carried on the movable plate 23 near the four corners thereof. The drive screws 30 are preferably ball screws.

Again on the movable plate 23, a crown gear 50 which has an outer toothing that meshes simultaneously with the outer toothing of the four lead screws is rotatably carried. In this manner the lead screws 40 are driven simultaneously by means of rotation around its own axis of the crown gear 50 which meshes with all the lead screws 40, thanks to the toothed profile formed directly by tooling of the lead screws. The drive of the nuts 40 causes screwing and unscrewing thereof on the respective drive screws 30 which remain fixed and therefore translation of the movable plate 23 on the linear guides 22 occurs.

The arrangement of the drive screws 30 in the corners of the two vertical plates 21 and 23 allows the plastication cylinder 2 and the hopper 3 to be housed on the fixed plate 21 and easy access to the drive system of the plastication screw 5 which can be provided on the movable plate 23 and which will be described below.

The injection assembly 1, thus structured, allows various possibilities of motorization and can thus be easily adapted and reconfigured.

Three possibilities for driving the injection assembly 1 according to he invention will be described below.

Figure 3:
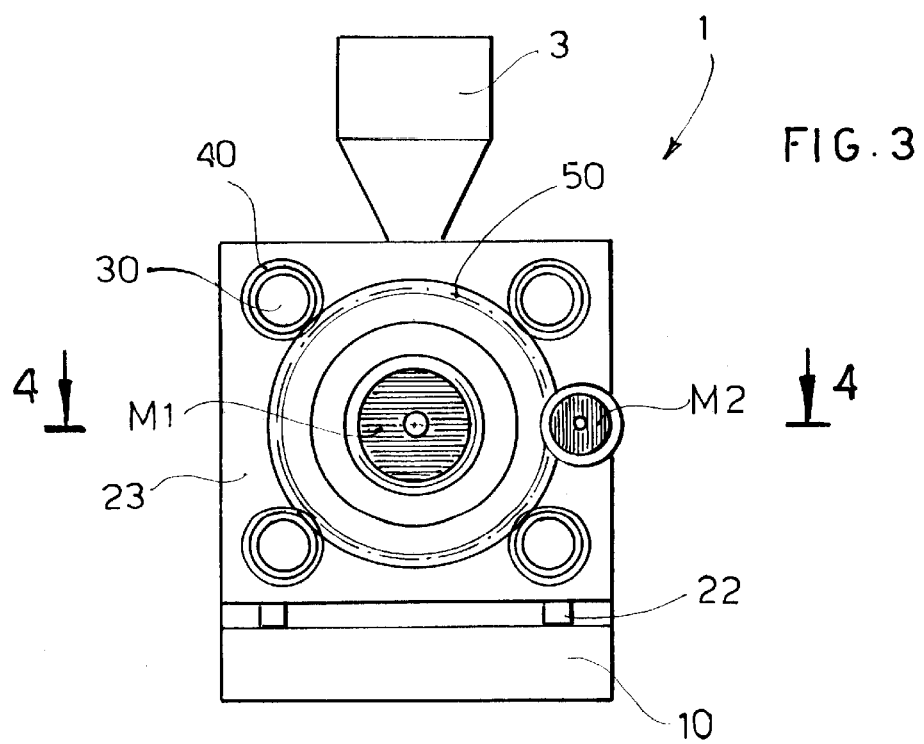
FIG. 3 is a schematic view from one end of the injection assembly according to FIG. 2, in which a first embodiment of its drive is illustrated.
Figure 4:
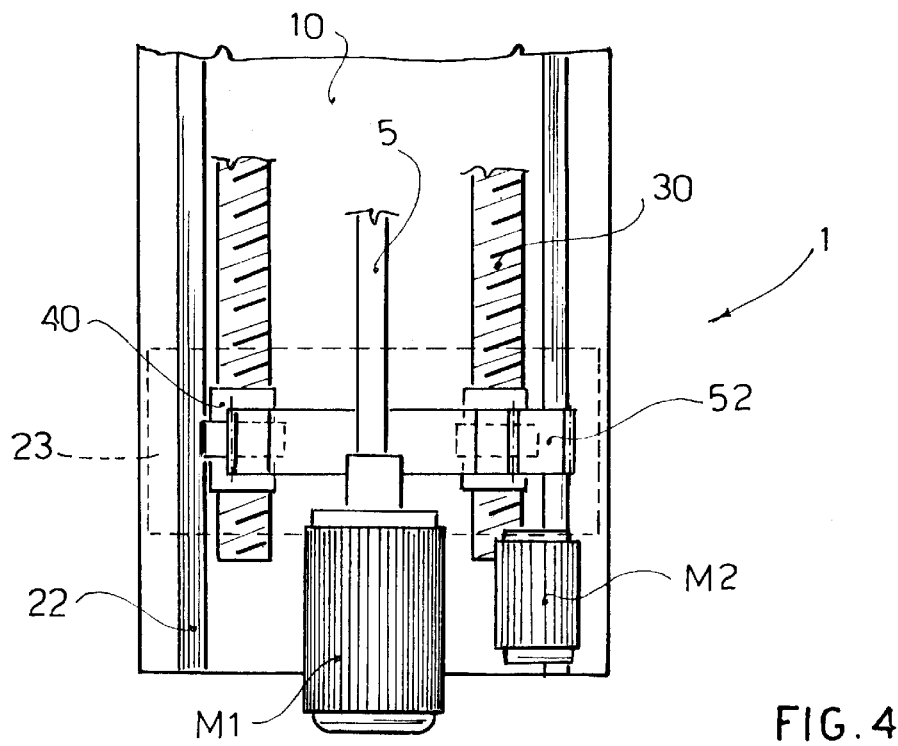
FIG. 4 is a broken off sectional view along the plane of section 4—4 in FIG. 3; the movable plate is denoted with a dashed line.

As shown in FIGS. 3 and 4, in this first embodiment of the drive system of the injection assembly 1 according to the invention, two independent motorizations are used; that is to say, a first electric motor M1 to drive the plastication screw 5 and a second electric motor M2 to drive the crown gear 50.

The first electric motor M1 can be carried on the movable plate 23 and connected in direct drive with the plastication screw 5. Alternatively, a reduction unit can be interposed between the shaft of the motor M1 and the plastication screw 5.

The second electric motor M2 can be connected, by means of a pinion, to the crown wheel 50 or alternatively a reduction unit can be interposed between the two. The motor M2 is mounted peripherally on the movable plate 23 and, as shown in FIG. 4, has a pinion 52 which meshes with the crown gear 50 to set it in rotation.

Operation of this first embodiment of the invention will now be described.

In the injection phase only the motor M2 which sets the lead screws 40 in rotation through the crown wheel 50 is activated; this rotation of the lead screws 40 around the respective drive screws 30 causes translation of the movable plate 23 integral with the plastication screw 5.

The injection speed is controlled by governing the speed of rotation of the second motor M2 by means of a suitable control which is not shown.

In the plastication stage the plastication screw 5 must perform a movement of rotation around its own axis. In this stage the plastication screw 5 must be able to simultaneously rotate and translate backward, as the plastic material is accumulated at the end of the plastication screw 5. As it moves retracts the plastication screw 5 must ensure a constant but adjustable pressure on the plastics material so as to compact the plastics material.

The plastication stage begins with rotation (for example in a counter-clockwise direction with reference to FIG. 3) of the plastication screw 5 by means of the first motor M1. Control of the pressure on the plastic material is achieved by acting, by means of the motor M2, on the speed of retraction of the movable plate 23.

Basically a closed loop circuit able to control the motor M2 is formed. The motor M2 initially maintains the lead screws 40 of the ball screws 30 blocked. In this manner there is an accumulation of plastic material in the injection chamber inside the cylinder 2 (the movable plate 23 and the plastication screw 5 do not retract in this stage).

The lead screws 40 remain still until the established pressure value is reached. Beyond this moment the system must provide a controlled rotation of the lead screws 40, imparted by the second motor M2, so as to cause the moveable plate 23 integral with the plastication screw to retract, maintaining the required pressure value on the plastic material constant.

The second motor M2 thus allows performance of the injection translation, the plastication screw return translation (shrinkage) and control of the pressure in the injection chamber during plastication.

It should be noted that the transmission ratio between the crown gear 50 and the pinion 52 of the motor M2 can be exploited favourably at the time it is chosen and dimensioned. This configuration of the drive system does not impose any limits on the types of motors and possible other transmissions that can be used.

With reference to FIGS. 5 and 6, a second embodiment of the injection assembly 1 is illustrated, in which a main power motor Mp, dimensioned to perform both the injection stage and the plastication stage is used. The main motor Mp is flanked by an auxiliary motor Maux able to control the return of the plastication screw 5 during the plastication stage.

As shown in FIG. 6, the main motor Mp has a drive shaft 70 connected to the crown wheel 50 and connected through a joint 63 to the plastication screw 5. A first one-way clutch device 60 is interposed between the shaft 70 and the crown gear 50 and a second one-way rotation clutch or device 61 is interposed between the shaft 70 and the joint 63. Each device 60 and 61 allows relative rotation between the drive shaft 70 and the crown gear 50 and between the drive shaft 70 and the joint 63 in only one direction and not in the opposite direction. In this case the first device 60 allows an opposite rotation with respect to the direction of rotation of the second device 61.

The auxiliary motor Maux has a pinion 71 which meshes on the outer toothing 72 of one of the four lead screws 40.

Operation of this second embodiment of the drive system of the injection assembly according to the invention will now be described.

During the injection stage the main motor Mp causes its drive shaft 70 to rotate for example in a clockwise direction (with reference to FIG. 5). In this case the first device 60 is blocked and draws the crown gear 50 into rotation. The crown gear 50 in turn simultaneously draws into rotation the four lead screws 40 which, screwing into the respective drive screws 30, cause the movable plate 23 and the plastication screw 5 to advance. In this manner a movement of pure translation of the plastication screw is obtained in that the second device 61 is free to rotate and sets the joint 63 free from the drive shaft 70 of the main motor Mp.

During the plastication stage the direction of rotation of the main motor Mp is reversed with respect to the injection stage. For example the drive shaft 70 is made to rotate in a counter-clockwise direction (with reference to FIG. 5). In this manner a rigid connection is made between the drive shaft 70 and the plastication screw 5 by means of the second device 61 and the joint 63. In fact the second one-way clutch 61 is blocked and sets in rotation the joint 63 integral with the plastication screw.

The crown gear 50, on the other hand, remains disconnected from the drive shaft 70, since the first device 60 is free to rotate.

To allow the return of the plastication screw 5, the auxiliary motor Maux is activated. The pinion 71 of the auxiliary motor Maux sets in rotation a lead screw 40 which in turn sets in rotation the crown gear 50. The crown gear 50 thus also simultaneously sets in rotation the other three lead screws 40. Consequently, the three lead screws 40 unscrew on their respective drive screws 30 causing retraction of the movable plate 23 integrally with the plastication screw 5.

The return of the plastication screw 5 is controlled by the auxiliary motor Maux which intervenes in accordance with the pressure value measured on the plastic material during plastication.

If the auxiliary motor Maux is given a direction of rotation opposite to the direction of rotation that ensures the return of the plastication screw 5, the movable plate is made to advance integrally with the plastication screw 5. Thus the auxiliary motor Maux can also be employed, together with its main motor Mp, also to contribute to providing power during the injection stage.

Figure 8:
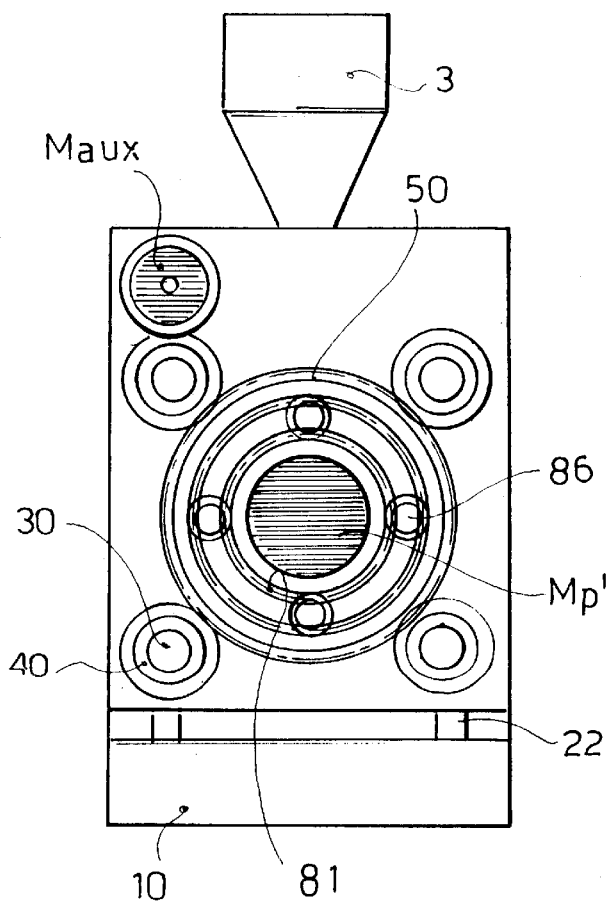
FIG. 8 is a view from the right in FIG. 7.

In FIGS. 7 and 8 a third embodiment of the drive system of the injection assembly 1 is shown, in which a main motor Mp' and an auxiliary motor Maux are connected to a combinatorial epicyclic reduction unit 80.

The drive shaft 70' of the main motor Mp' is integral with a gear wheel 81 that acts as the first end wheel of the epicyclic reduction unit 80. The second end wheel of the epicyclic reduction unit 80, on the other hand, is formed by the crown gear 50 which meshes with the four lead screws 40. One of the four lead screws 40 is driven by the auxiliary motor Maux, by means of the pinion 71.

Gear wheels 86 forming part of a gear train 82 are interposed between the first end wheel 81 and the second end wheel 50 of the epicyclic reduction unit 80. The gear train 82 is directly connected to the plastication screw 5 by means of an axially disposed joint 84. Around the joint 84 of the gear train 82 is disposed a device 61' with one-way clutch 61 that engages in a seat of the movable plate 23 allowing rotation of the gear train 82 in only one direction.

In the injection stage the two motors Mp' and Maux, for example, are driven in the same direction of rotation. The main motor Mp' sets in rotation the end wheel 81 which tends to make the gears 86 of the gear train 82 rotate. In this case the limited rotation mechanism 61' is blocked and prevents rotation of the gear train 82 and thus of the plastication screw 5.

The gear wheels 86 of the gear train 82, being set in rotation by the first end wheel 81, set in rotation the crown gear 50 which in turn simultaneously sets in rotation the four lead screws 40 which screw into the drive screws 30 allowing forward movement of the plastication screw 5.

The auxiliary motor Maux, by means of its pinion 71, sets in rotation one of the four lead screws 40 which in turn acts on rotation of the crown wheel 50. Thus the crown wheel 50, which in turn drives the lead screws 40, is driven thanks to the intervention of the two motors Mp' and Maux which suitably share the loads.

The plastication stage, on the other hand, takes place through the combination of the movements of the two motors Mp' and Maux which will produce both rotation of the screw 5 and controlled return thereof.

That is to say, the main motor Mp' is made to rotate in the opposite direction to the direction of rotation of the plastication stage and the auxiliary motor Maux is made to rotate in the opposite direction to the direction of the main motor Mp'. Consequently, the first end wheel 81 tends to set in rotation the gears wheels 86 of the gear train 82 and the one-way clutch 61' of the gear train is free to rotate, thus the gear train sets in rotation the plastication screw 5.

The auxiliary motor Maux acts on one of the four lead screws 40 in the direction of unscrewing of the lead screw of the drive screw 30. Thus this lead screw sets in rotation the crown gear 50 which in turn drives the other three lead screws allowing retraction of the plastication screw 5.

The epicyclic reduction unit is subject to Willis' rule, which expresses the relationship between speed of rotation of the end wheels 81 and 50 and that of the frame of the gear train 82.

If $\omega 1$ is the speed of rotation of the first end wheel 81

$\omega 2$ is the speed of rotation of the second end wheel 50

$\omega 3$ is the speed of rotation of the gear train 82, and $\tau_o$ is the ordinary transmission ratio of the gearing the following formula is obtained:

$$\tau_0 = \frac{\omega 1 - \omega 3}{\omega 2 - \omega 3}$$

Numerous variations and modifications of detail within the reach of a person skilled in the art can be made to the present embodiment of the invention without thereby departing from the scope of the invention as set forth in the appended claims.

What is claimed is:

1. An injection assembly (1) for injection moulding machines for plastics materials, comprising:

a fixed frame (10, 21), a plastication cylinder (2) integral with said fixed frame, a plastication screw (5) acting inside said plastication cylinder (2), said plastication screw making a translational forward movement during the stage of injection of the plastics material inside a mould cavity and a rotatory movement around its own axis and a rotatory-translational movement of rotation around its own axis and retraction during the plastication stage of the plastics material, and drive means able to confer said translational, rotatory and rotatory-translational movements upon said plastication screw (5), characterized in that said drive means comprise:

a movable plate (23) integral in translation with said plastication screw (5) and slidably mounted on said fixed frame, drive means for translation of said movable plate (23) comprising at least two drive screws (30), integral with said fixed frame (21), and engaging respectively in at least two lead screws or nuts (40) rotatably mounted on said movable plate (23), and drive means for the lead screws able to give said lead screws (40) a rotatory movement and comprising a crown gear (50) having external toothing which meshes with the external toothing of said lead screws (40), so as to simultaneously drive all the lead screws 40; and drive means for rotation of said plastication screw (5) comprising two independent motorizations (M1, M2) acting respectively on the plastication screw to set it in rotation and on the crown gear (50) to allow translation of said movable plate (23).

2. An injection assembly (1) for injection moulding machines for plastics materials, comprising:

a fixed frame (10, 21), a plastication cylinder (2) integral with said fixed frame, a plastication screw (5) acting inside said plastication cylinder (2), said plastication screw making a translational forward movement during the stage of injection of the plastics material inside a mould cavity and a rotatory movement around its own axis and a rotatory-translational movement of rotation around its own axis and retraction during the plastication stage of the plastics material, and drive means able to confer said translational, rotatory and rotatory-translational movements upon said plastication screw (5), characterized in that said drive means comprise:

a movable plate (23) integral in translation with said plastication screw (5) and slidably mounted on said fixed frame, drive means for translation of said movable plate (23) comprising at least two drive screws (30), integral with said fixed frame (21), and engaging respectively in at least two lead screws or nuts (40) rotatably mounted on said movable plate (23), and drive means for the lead screws able to give said lead screws (40) a rotatory movement and comprising a crown gear (50) having external toothing which meshes with the external toothing of said lead screws (40), so as to simultaneously drive all the lead screws (40);

said drive means of the plastication screw comprising a main motor (Mp; Mp') comprising a drive shaft (70, 70') connected, through connection means, to said plastication screw (5) and said crown gear (50) so that rotation of the drive shaft in one direction causes rotation of the plastication screw (5) and rotation of the drive shaft in the opposite direction causes rotation of the crown gear (50).

3. An injection assembly according to claim 2, characterized in that said connection means comprise:

a first one-way clutch (60) mounted on the drive shaft (70) rotate in only one direction and engaged with a profile of said crown gear (50), and a second one-way clutch (61) mounted on the drive shaft (70) to rotate in the opposite direction of rotation to the first one-way clutch (60), said second one-way clutch engaged with a profile of a joint (63) integral with said plastication screw (5).

4. An injection assembly according to claim 2 characterized in that said connecting means comprise an epicyclic reduction mechanism (80).

5. An injection assembly according to claim 4, characterized in that said epicyclic reduction mechanism comprises:

a first end wheel (81) integral with the drive shaft (70') of said main motor (Mp'), a second end wheel coinciding with said crown gear (50) and having a greater diameter than said first end wheel, a gear train (82) comprising gear wheels (86) interposed between said first end wheel (81) and said second end wheel (50) said gear train (82) comprising a joint (84) connected integrally to said plastication screw, a one-way clutch (61') engaging in a seat of said movable plate (23) being mounted to rotate in only one direction on said joint.

6. An injection assembly according to claim 2, characterized in that the drive means of the plastication screw comprise at least one auxiliary motor (Maux) acting on at least one of said lead screws (40).

7. An injection assembly according to claim 6, characterized in that said auxiliary motor (Maux) acts on said lead screw (40) to impart a backward movement of said movable plate (23) when said main motor (Mp; Mp') imparts the rotation of said plastication screw (5) during the plastication stage.

8. An injection assembly according to claim 6, characterized in that said auxiliary motor (Maux) acts on said lead screw (40) to impart a forward movement of said movable plate (23), when said main motor (Mp; Mp') acts on the crown gear (50) to impart a forward movement of the movable plate (23) during the injection stage.

9. An injection assembly (1) for injection moulding machines for plastics materials, comprising:

a fixed frame (10, 21), a plastication cylinder (2) integral with said fixed frame, a plastication screw (5) acting inside said plastication cylinder (2), said plastication screw making a translational forward movement during the stage of injection of the plastics material inside a mould cavity and a rotatory movement around its own axis and a rotatory-translational movement of rotation around its own axis and retraction during the plastication stage of the plastics material, and drive means able to confer said translational, rotatory and rotatory-translational movements upon said plastication screw (5), characterized in that said drive means comprise:
- a movable plate (23) integral in translation with said plastication screw (5) and slidably mounted on said fixed frame,
- drive means for translation of said movable plate (23) comprising at least two drive screws (30), integral with said fixed frame (21), and engaging respectively in at least two lead screws or nuts (40) rotatably mounted on said movable plate (23), and drive means for the lead screws able to give said lead screws (40) a rotatory movement and comprising a crown gear (50) having external toothing which meshes with the external toothing of said lead screws (40), so as to simultaneously drive all the lead screws (40);
- drive means for rotation of said plastication screw (5) comprising two independent motorizations (M1, M2) acting respectively on the plastication screw to set it in rotation and on the crown gear (50) to allow translation of said movable plate (23);
- said fixed frame comprising a base (10) comprising linear guides (20) on which said movable plate (23) can slide, and a fixed plate (21) substantially transverse to said base (10) integrally supporting said plastication cylinder (2); and
- said fixed plate (21) and said movable plate (23) being substantially square and the drive means of said movable plate (23) comprising four drive screws (30) mounted integrally near the four corners of said fixed plate (21) and engaging in four respective lead screws (40) rotatably mounted near the four corners of said movable plate (23).

10. An injection assembly according to claim 9, characterized in that said plastication cylinder (2) is mounted in a central position in said fixed plate (21) and said plastication screw (5) is mounted in a central position in said movable plate (23).

* * * * *